(No Model.)
E. D. EVANS.
LEATHER ROLLING APPARATUS.
No. 564,511. Patented July 21, 1896.
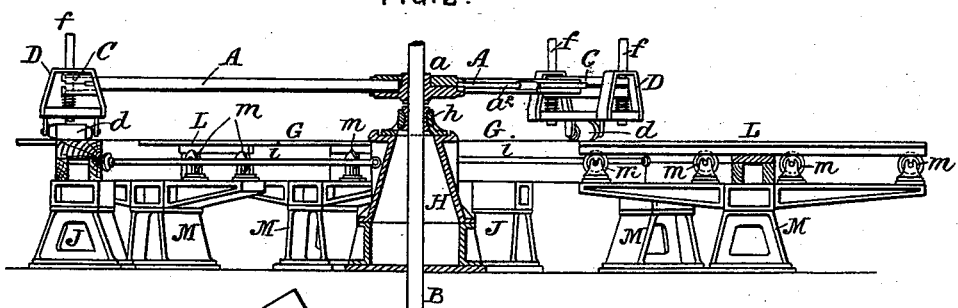
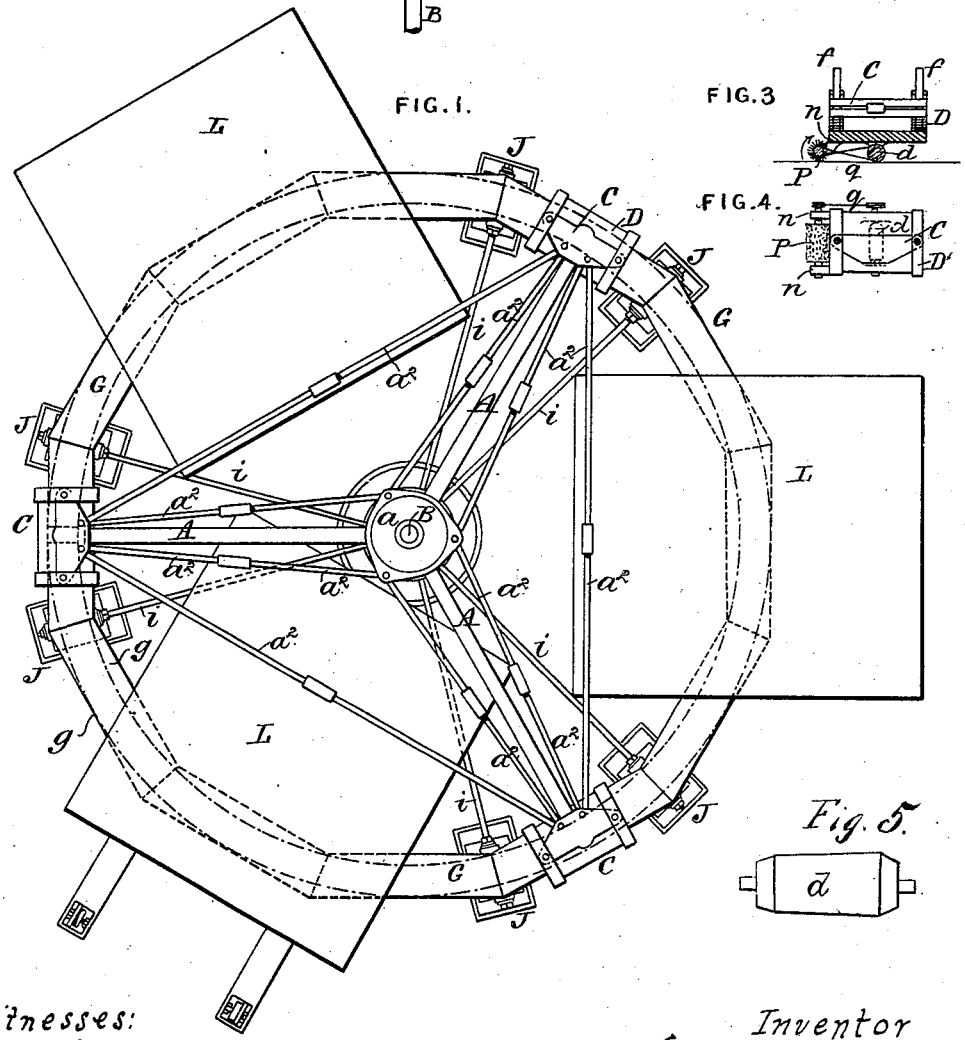
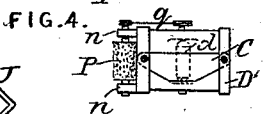
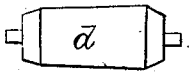
Witnesses:
E. J. Griswold
L. Wenke
Inventor
Ernest D. Evans
By his attorneys
Howson and Howson

UNITED STATES PATENT OFFICE.

ERNEST D. EVANS, OF BRISTOL, ENGLAND.

LEATHER-ROLLING APPARATUS.

SPECIFICATION forming part of Letters Patent No. 564,511, dated July 21, 1896.

Application filed October 1, 1895. Serial No. 564,290. (No model.)

*To all whom it may concern:*

Be it known that I, ERNEST DERING EVANS, tanner, a subject of the Queen of Great Britain and Ireland, residing in the city and county of Bristol, England, have invented certain Improvements in Apparatus for Use in Rolling and Finishing Leather and for Analogous Operations, of which the following is a specification.

My invention has for its object to provide apparatus especially intended for rolling and finishing leather, but applicable also to other operations wherein substances are to be subjected to the action of rollers.

According to my invention I mount the rollers so that they revolve or travel continuously in a circular or annular path, and in their travel act upon the leather or other material placed upon the bed over which the rollers travel. The rollers are arranged radially and should be conical, with their smaller ends toward the center around which they revolve and their bearings correspondingly arranged, so that the said rollers travel and rotate without dragging over the surfaces on which they bear. The apparatus may be provided with one roller or with any number of rollers, carried by a wheel or wheels or by an arm or arms projecting from the center of motion which may be a shaft driven by any convenient prime mover.

A convenient form of apparatus constructed in accordance with my invention is illustrated in the accompanying drawings.

Figure 1 is a plan, and Fig. 2 a transverse section. Figs. 3 and 4 show in elevation and plan the way in which a brush or other finishing device may be combined with the roller or rollers. Fig. 5 shows one of the rollers detached.

The machine illustrated is provided with three arms projecting radially from the center of motion and each carrying a roller or rollers bearing upon a circular or annular table or track upon which the leather or other material to be rolled or finished is placed. The said arms are marked A and their inner ends are secured in a boss $a$, keyed or otherwise secured to a driving-shaft B, so that the said arms turn with the said shaft. To the outer ends of the said arms are fixed carriages C, having bearings for carrying the axes of the rollers $d$. The arms A pass through slots $m$ or between parts of the carriages C. The rollers are made conical, as aforesaid, to suit the circular or annular path on which they run, and the bearings are arranged to correspond. To moderate the oscillating motion of the carriage, it may be made, as shown, with pins $f$, passing through pieces D, which form part of carriages C, and on these pins $f$ springs are fitted, as shown. The carriages can be so made as to support weights if necessary.

Underneath the rollers and supporting the said rollers is a circular or annular track G, made and supported in any suitable way, but shown in the drawings as being made up of straight pieces constituting in effect a circular or annular track, the actual working path of the rollers being indicated by the dot-and-pick lines $g$. The shaft B may be supported in any convenient way from above or below or both. It is shown as passing through a bearing $h$, carried by a central standard or support H, from which tie-bars $i$ extend to assist in supporting and strengthening the circular or annular track G, which is further supported by standards or supports J.

$a^2$ are tie-rods to strengthen and support the arms A.

The tables L are for supporting the leather or other material. Of these tables there may be one or any suitable number. I have shown three in the drawings. The upper surfaces thereof are level with the circular or annular track G and form part thereof. These tables may be stationary and the leather or other material be moved over them, or they may be mounted on rollers, as shown at $m$, carried by the standards or supports M, so that the tables with the leather or material thereon can be moved radially to present the various portions of the leather or other material to the action of the rollers. The tables in the arrangement shown are supposed to be moved inward and outward by hand, but they can be moved inward and outward by mechanical means if desired, such as, for instance, by a "mangle-wheel" gear driven from the central shaft.

I do not limit myself to the precise details shown in the drawings, as it will be evident that they can be considerably modified without departing from the nature of my invention. There may be combined with the rollers any other additional devices for acting on the leather or other material for assisting in finishing it, such, for instance, as brushes, which may be carried in proximity to each roller and be actuated so as to rotate with the rollers to brush the leather or other material as it is being rolled.

In Figs. 3 and 4 I have shown arms at $n$, projecting from the roller-carriage, the said arms having bearings for the axis of a brush P, which rotates with the roller by being geared therewith in any suitable way, for example, by the pulley and band at $q$. This brush or other device may be conical and its bearings be correspondingly arranged as described with regard to the rollers to suit the circular or annular path on which they run.

Having now particularly described and ascertained the nature of my said invention and in what manner the same is to be performed, I declare that what I claim is—

In an apparatus for rolling and finishing leather or for analogous purposes, the combination of a frame carrying rollers and revolving about a center, with an annular track over which the rollers travel, and horizontally-movable tables level with the surface of the track, substantially as set forth.

In testimony whereof I have signed my name to this specification in the presence of two subscribing witnesses.

ERNEST D. EVANS.

Witnesses:
W. C. H. CROSS,
GILBERT J. WHITE.